(12) United States Patent
Coleman et al.

(10) Patent No.: US 6,230,695 B1
(45) Date of Patent: May 15, 2001

(54) EXHAUST GAS RECIRCULATION SYSTEM

(75) Inventors: Gerald N. Coleman, Peoria; Dennis D. Feucht, Morton; Keith E. Lawrence, Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/274,140

(22) Filed: Mar. 22, 1999

(51) Int. Cl.[7] .................................................. F02B 33/44
(52) U.S. Cl. .............................. 123/568.12; 123/559.1; 123/563; 123/568.15; 60/278; 60/605.2
(58) Field of Search ...................... 123/568.12, 568.15, 123/568.11, 559.1, 559.3, 561, 563, 564; 60/278, 279, 605.2

(56) References Cited

U.S. PATENT DOCUMENTS

| | | |
|---|---|---|
| 3,149,454 | 9/1964 | Hahn ........................................ 60/13 |
| 3,712,280 | 1/1973 | Brille et al. ..................... 123/119 CB |
| 4,048,968 | 9/1977 | Aoyama ............................ 123/119 A |
| 4,206,606 * | 6/1980 | Yamada ............................. 60/605.2 |
| 4,215,550 * | 8/1980 | Dinger et al. .......................... 60/606 |
| 4,231,225 | 11/1980 | Aya ...................................... 60/612 |
| 4,350,013 * | 9/1982 | Yoshiba ............................. 60/605.2 |
| 4,350,135 * | 9/1982 | Casey et al. .......................... 123/564 |
| 4,426,848 * | 1/1984 | Stachowicz ......................... 60/605.2 |
| 4,474,008 * | 10/1984 | Sakurai et al. ...................... 60/605.2 |
| 4,702,218 | 10/1987 | Yoshioka et al. ..................... 623/559 |
| 4,738,110 | 4/1988 | Tateno ................................. 60/610 |
| 4,903,488 | 2/1990 | Shibata ................................ 60/609 |
| 5,142,866 * | 9/1992 | Yanagihara et al. ................ 60/605.2 |
| 5,203,311 | 4/1993 | Hitomi et al. ........................ 123/570 |
| 5,425,239 | 6/1995 | Gobert ............................... 60/605.2 |
| 5,611,202 * | 3/1997 | Sumser et al. ..................... 60/605.2 |
| 5,611,203 * | 3/1997 | Henderson et al. ................ 60/605.2 |
| 5,611,204 * | 3/1997 | Radovanovic et al. ............. 60/605.2 |
| 5,657,630 * | 8/1997 | Kjemtrup et al. .................. 60/605.2 |
| 5,669,365 * | 9/1997 | Gartner et al. ....................... 123/570 |
| 5,671,600 * | 9/1997 | Pischinger et al. ................. 60/605.2 |
| 5,740,786 * | 4/1998 | Gartner ............................. 123/568.12 |
| 5,771,868 | 6/1998 | Khair ................................... 123/570 |
| 5,794,445 * | 8/1998 | Dungner ............................. 60/605.2 |
| 5,802,846 * | 9/1998 | Bailey .................................. 60/278 |
| 5,806,308 * | 9/1998 | Khair et al. ........................... 60/278 |
| 5,927,075 * | 7/1999 | Khair ................................. 60/605.2 |
| 5,974,802 * | 11/1999 | Blake ................................ 60/605.2 |
| 6,006,733 * | 12/1999 | Oleksiewicz ..................... 123/568.26 |
| 6,014,960 * | 1/2000 | Oleksiewicz ....................... 123/568.2 |
| 6,026,791 * | 2/2000 | Arnold ............................ 123/568.27 |

\* cited by examiner

*Primary Examiner*—Willis R. Wolfe
*Assistant Examiner*—Hai Huy Nh
(74) *Attorney, Agent, or Firm*—Larry G. Cain

(57) ABSTRACT

Past exhaust emission control systems fail to utilize exhaust gas recirculation during all operating parameters of an engine. The present exhaust gas recirculation system reduces the emissions emitted from an engine during all operating parameters of the engine. The engine has a cylinder, a rotatable crankshaft and a turbocharger defining a compressor section compressing a flow of intake air to a first preestablished pressure and being driven by a flow of exhaust gas having a first preestablished pressure. The exhaust gas recirculation system is comprised of a portion of the flow of exhaust gas being recirculated back to the cylinder and forming a flow of exhaust gas recirculation. The flow of exhaust gas recirculation is cooled. The flow of exhaust gas recirculation is mixed with exhaust gas and compressed to a second preestablished pressure by the positive displacement pump. The second preestablished pressure of the flow of exhaust gas recirculation is at least as great as the first preestablished pressure of the intake air. And, a quantity of the flow of exhaust gas recirculation is controlled by a mixing valve. The mixing valve has an open position in which a portion of the flow of intake air is mixed with the flow of exhaust gas recirculation and a closed position in which the flow of intake air is blocked.

20 Claims, 2 Drawing Sheets

EXHAUST GAS RECIRCULATION SYSTEM

TECHNICAL FIELD

This invention relates generally to an engine and more particularly to a reduction of exhaust emissions.

BACKGROUND ART

The use of fossil fuel as the combustible fuel in engines results in the combustion products of carbon monoxide, carbon dioxide, water vapor, smoke and particulate, unburned hydrocarbons, nitrogen oxides and sulfur oxides. Of these above products carbon dioxide and water vapor are considered normal and unobjectionable. In most applications, governmental imposed regulations are restricting the amount of pollutants being emitted in the exhaust gases.

In the past, NOx emissions have been reduced by reducing the intake manifold temperature, retarding the injection timing, and modifying the injection rate shape. And, the adverse effects on fuel consumption, particulate emissions engine performance have largely been alleviated through improvements in the basic engine design and fuel selection. For example, at the present time smoke and particulates have normally been controlled by design modifications in the combustion chamber and injection pressure. Particulates are also controlled by traps and filters, and sulfur oxides are normally controlled by the selection of fuels being low in total sulfur. This leaves carbon monoxide, unburned hydrocarbons and nitrogen oxides as the emission constituents of primary concern in the exhaust gas being emitted from the engine.

Many systems have been developed for recycling a portion of the exhaust gas through the engine thereby reducing the emission of these constituents into the atmosphere. The recirculation of a portion of exhaust gas is used to reduce NOx pollution emitted to the atmosphere. In a naturally aspirated engine this process is relative simple. But, with a turbocharged engine, the recirculation of a portion of the exhaust gas into the intake air becomes more complex because the intake pressure is higher than the exhaust pressure during many operating conditions. In many of such past system a volume of the exhaust gas from the engine was redirected to the intake air of the engine through the turbocharger and/or an aftercooler and to the engine. Such systems caused the premature plugging of aftercooler cores and malfunctioning of the systems. Additionally, with such recirculation system deterioration of the exhaust flow was caused by deposit buildup.

Various approaches have been used to address the adverse pressure gradient issue. For example, throttling valves have been installed in the air inlet, back pressure valves in the exhaust gas, intake manifold venturi tubes, etc. to provide sufficient pressure drop to get the exhaust gas to flow to the intake air. Although this provides the necessary pressure drop to functionally operate an exhaust gas recirculation system several disadvantages, such as, fuel consumption, emissions, and/or performance occur.

The present invention is directed to overcoming one or more of the problems as set forth above.

DISCLOSURE OF THE INVENTION

In one aspect of the invention an exhaust gas recirculation system is used with an engine. The engine defines a plurality of operating parameters and has a rotatable member, such as a crankshaft through which an engine speed can be defined. A plurality of cylinders are defined as a part of the engine. The exhaust gas recirculation system is comprised of a flow of intake air entering a respective one of the plurality of cylinders. The intake air is pressurized to a preestablished pressure. A supply of combustible fuel enters the respective one of the plurality of cylinders. A combustion process within the respective one of the plurality of cylinders defines a flow of exhaust gas having a preestablished pressure being less that the preestablished pressure of the intake air during at least a portion of the engine operating parameters. A portion of the exhaust gas being circulated to the intake air defines a flow of exhaust gas recirculation. The flow of exhaust gas recirculation is cooled prior to being pressurized to a preestablished level and the pressurization of the flow of recirculated exhaust gas being by a positive displacement pump and being at a pressure at least as great as the preestablished pressure of the intake air. And, a mixing valve is interposed the flow of intake air and the flow of exhaust gas recirculation. The mixing valve is movable between a closed position and an open position. In the open position, intake air is supplied to the positive displacement pump.

In another aspect of the invention an exhaust gas recirculation system is used with an engine. The engine has a plurality of operating parameters, a cylinder and a rotatable member or crankshaft. The engine has a turbocharger defining a compressor section compressing a flow of intake air to a first preestablished pressure and is driven by a flow of exhaust gas having a first preestablished pressure. The exhaust gas recirculation system is comprised of a portion of the flow of exhaust gas being recirculated back to the cylinder and forming a flow of exhaust gas recirculation. The flow of exhaust gas recirculation is cooled. A portion of the flow of intake air is further compressed to a second preestablished pressure by a positive displacement pump during a portion of the operating parameters of the engine. The flow of exhaust gas recirculation is compressed to a second preestablished pressure by the positive displacement pump. The second preestablished pressure of the flow of exhaust gas recirculation is at least as great as the first preestablished pressure of the intake air. And, a quantity of the flow of exhaust gas recirculation is controlled by a mixing valve. The mixing valve has an open position in which the portion of the flow of intake air is further compressed to a second preestablished pressure flowing therethrough and a closed position in which the flow of intake air is blocked.

In another aspect of the invention a method of reducing exhaust emissions from an engine having a flow of intake air being at a preestablished pressure, a flow of exhaust gas being at a preestablished pressure being less than the preestablished pressure of the intake air is defined. The method of reducing exhaust emission uses the steps of: extracting a portion of the flow of exhaust gas forming a flow of exhaust gas recirculation; cooling the flow of exhaust gas recirculation; increasing the pressure of the flow of exhaust gas recirculation with a positive displacement pump to a quantity being at least equivalent to the pressure of the flow of intake air; and blending the flow of exhaust gas recirculation and a portion of the flow of intake air prior to the pressure of the flow of exhaust gas recirculation being increased to a quantity being at least equivalent to the pressure of the flow of intake air.

BEST MODE FOR CARRYING OUT THE INVENTION

Figure 1:
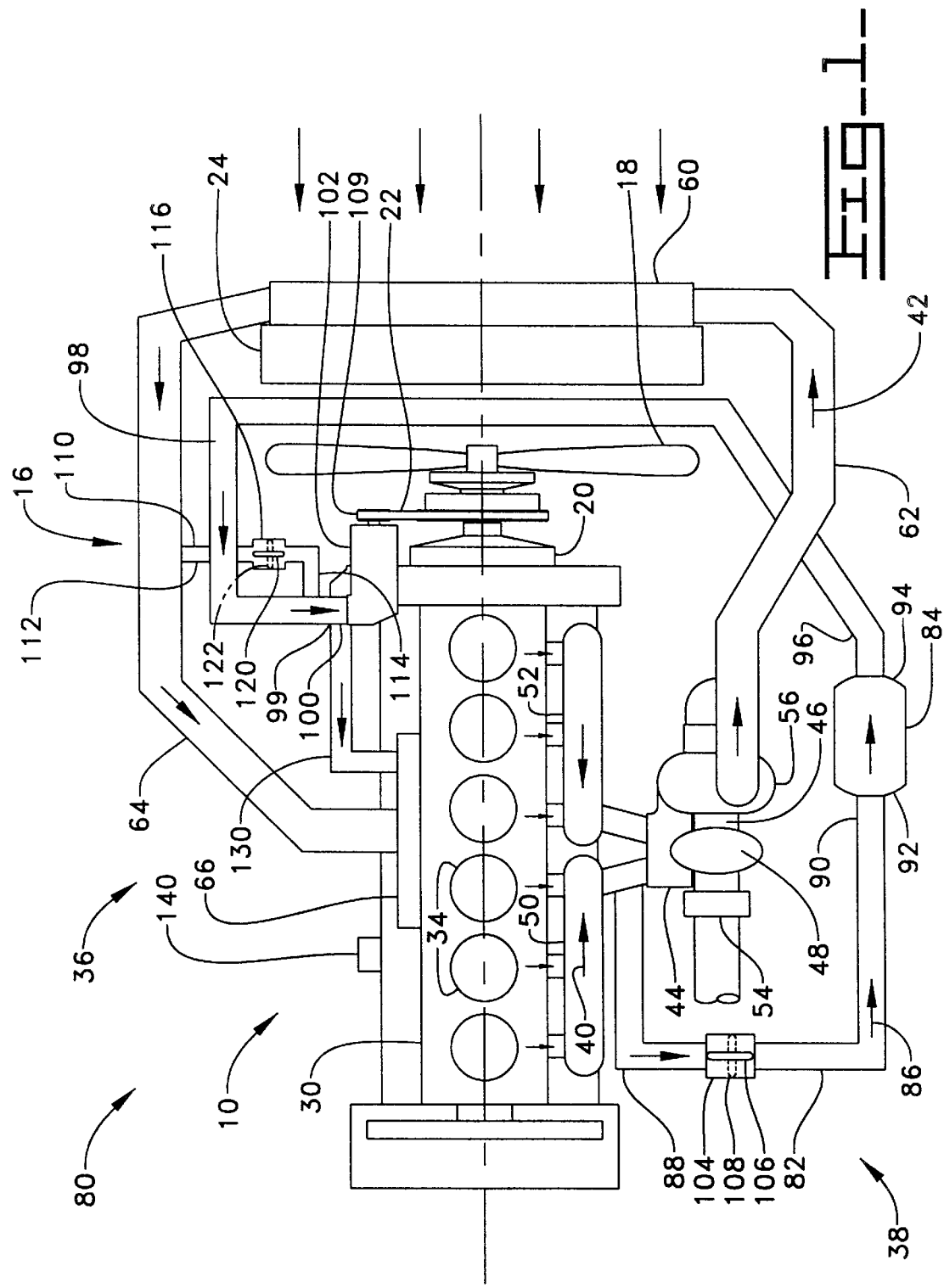
FIG. 1 is a schematic view of an engine embodying an exhaust gas recirculation system.
Figure 2:
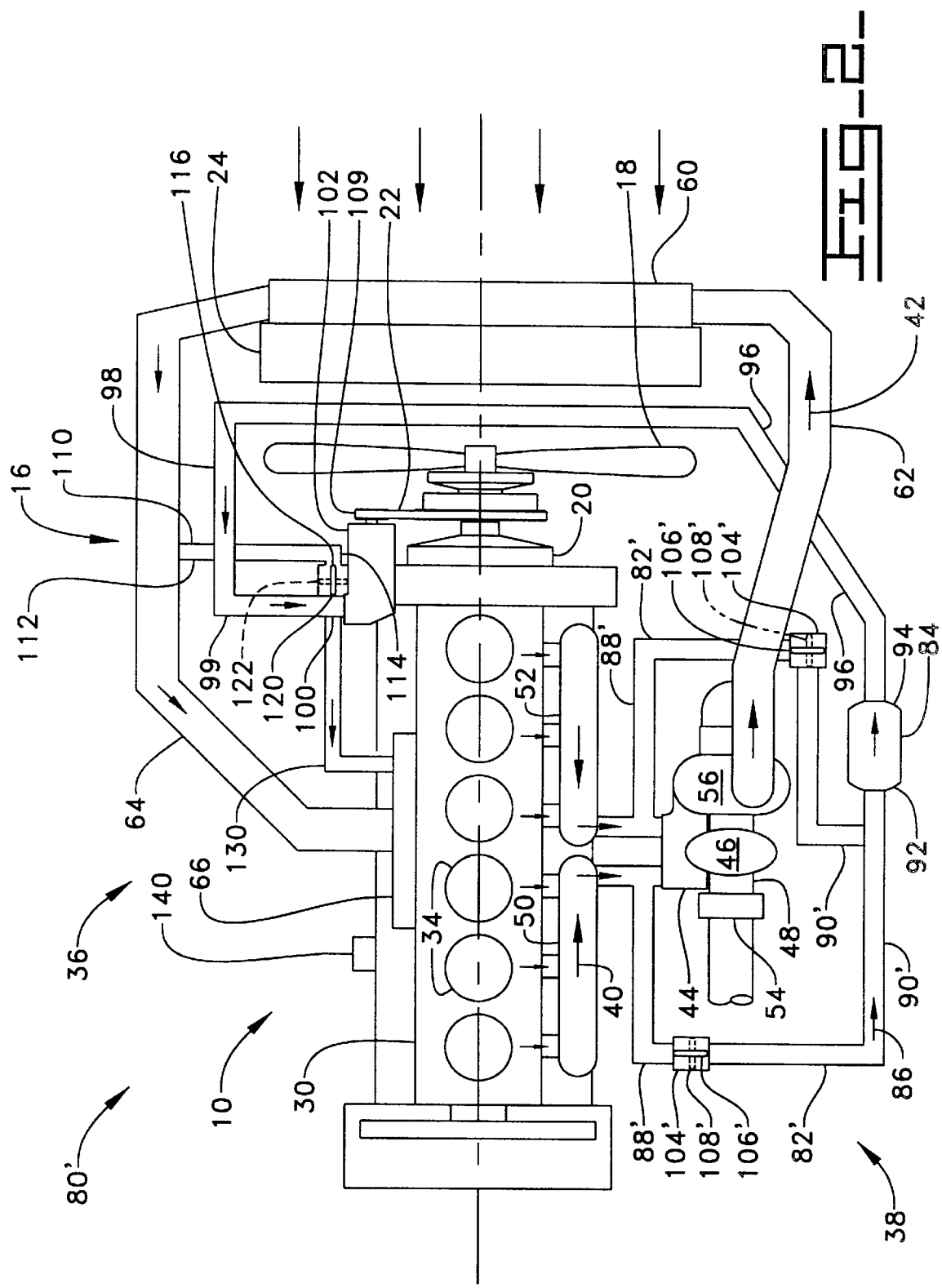
FIG. 2 is a schematic view of an engine embodying another exhaust gas recirculation system.

Referring to FIGS. 1 and 2, an engine 10 is schematically shown. A conventional cooling system 16 is operatively connected to the engine 10 in a conventional manner. The cooling system 16, in this application, includes a fan 18 being attached to the engine 10 and being driven by a rotatable member which in this application is a crankshaft 20 of the engine 10. The fan 18 is operatively driven by a belt 22 in a conventional manner. However, as an alternative, the fan could be driven by a motor being remotely attached in other conventional manners without changing the essence of the invention. A radiator 24 is connected to the engine 10 in a conventional manner and is a part of the cooling system 16. The radiator 24 operatively cools the engine 10 in a conventional manner.

The engine 10 includes a block 30 having a plurality of cylinder 34 therein. For example, an inline-6 cylinder is shown; however, as an alternative an inline-4 or a V configuration could be used without changing the essence of the invention. The engine 10 includes an air intake system 36 and an exhaust system 38. After a combustion process, a flow of exhaust gas designated by the arrows 40 exits each of the respective plurality of cylinders 34 at a first preestablished pressure. The flow of exhaust 40 exits through the exhaust system 38 in a conventional manner. A flow of intake air designated by the arrows 42 enters each of the respective plurality of cylinders 34 through the air intake system 36 as will be defined later.

The exhaust system 38 includes an exhaust manifold 44 being attached to the block 30 and has the flow of exhaust gas 40 exiting the plurality of cylinders 34 of the engine 10 passing therethrough. A turbocharger 46 is a part of the exhaust system 38 and is attached to the engine 10, as will be explained further. A turbine section 48 is operatively connected to and driven by the flow of exhaust gas 40 from the combustion process within the plurality of cylinders 34. For example, in this application, a first exhaust manifold portion 50 is connected to a first set of three cylinders and a second set of three cylinders 34 are connected a second exhaust manifold portion 52. The turbine section 48 is connected to each of the first exhaust manifold portion 50 and the second exhaust manifold portion 52. The flow of exhaust gas 40 exits an exhaust opening 54 in the turbine section 48 and passes through a muffler, not shown, to the atmosphere. The turbocharger 46 further includes a compressor section 56 being driven by the turbine section 48 in a conventional manner.

The air intake system 36 is operatively connected to the compressor section 56 of the turbocharger 46 in a conventional manner. The flow of intake air 42 is communicated from the atmosphere through a filter, not shown, to the compressor section 56 of the turbocharger 46 in a convention manner. The compressor section 56 pressurizes the intake air 42 to the first preestablished pressure level. During some operating parameters of the engine 10, the first preestablished pressure level of the intake air 42 is above the pressure level of the exhaust gas 40. Other conventional system could be use to increase the pressure of the intake air 42 without changing the jest of the invention. The intake air 42 is communicated from the compressor section 56 through an aftercooler 60 by a first conduit 62. In this application, the aftercooler 60 is an air to air aftercooler being operatively positioned with the radiator 22 in a conventional manner. From the aftercooler 60, the intake air 42 passes through a second conduit 64 and operatively enters the respective one of the plurality of cylinders 34 through an intake manifold 66.

An exhaust gas recirculation system 80 is operatively attached to the engine 10. The exhaust gas recirculation system 80 includes a supply line 82 being operatively connected between the flow of exhaust gas 40 and an exhaust gas recirculation cooler 84. A flow of exhaust gas to be recirculated, designated by arrow 86, passes therethrough. The cooling of the exhaust gas recirculation cooler 84 can be of any convention means such as engine 10 jacket water cooling, air to air or an external cooling media. As shown in FIG. 1, the supply line 82 has a first end portion 88 attached to the first exhaust manifold portion 50 at a position spaced at a predetermined distance from the intersection of the first exhaust manifold 50 and the second exhaust manifold portion 52 of the exhaust manifold 44. A second end 90 of the supply line 82 is attached to an inlet end portion 92 of the exhaust gas recirculation cooler 84. An outlet end portion 94 of the exhaust gas recirculation cooler 84 has a first end 96 of a first tube 98 attached thereto. A second end 99 of the first tube 98 is attached to an inlet portion 100 of a positive displacement pump 102. Within the positive displacement pump 102, the exhaust gas recirculation 86 is pressurized to a second preestablished pressure being at least as high as the first preestablished pressure of the intake air 42. Interposed the first end portion 88 and the second end 90 of the supply line 82 is a control valve 104. The control valve 104 is operable through a plurality of positions between an open position 106 and a closed position 108, shown in phantom, varying the area through which the exhaust gas recirculation 86 will flow.

The positive displacement pump 102 is attached to the engine 10 in a conventional manner and is driven by the engine 10 crankshaft 20 in a conventional manner, such as, by a belt 109, or, as an alternative, a plurality of gears, not shown. The positive displace pump 102 is driven at an increased fixed speed ratio as compared to an engine 10 speed measured at the crankshaft 20. The positive displacement pump 102 can be driven off either the engine crankshaft 20 or the engine mounted cooling fan 18 without changing the jest of the invention. As a further alternative, the positive displacement pump could be driven externally by a hydraulic motor or an electric motor.

The exhaust gas recirculation system 80 further includes a second tube 110 interposed the second conduit 64 and the inlet portion 100 of the positive displacement pump 102. In this application, a first end 112 of the second tube 110 is attached to the first conduit 64 and a second end 114 of the second tube 110 is attached to the inlet portion 100 of the positive displacement pump 102. In this application, the second end 114 of the second tube 110 is attached to the first tube 98 prior to the position where the second end 99 of the first tube 98 is attached to the inlet portion 100 of the positive displacement pump 102.

A mixing valve 116 is positioned in the second tube 110. For example, the mixing valve 116 is positioned between the first end 112 of the second tube 110 and the intersection of the second tube 98 with the third tube 110. The mixing valve 116 is movable between an open position 120 and a closed position 122, shown in phantom. The mixing valve 116 is infinitely movable between the open position 120 and the closed position 122. As shown in FIG. 2, the mixing valve 116 is integrated into the pump 102 inlet portion 100.

From the positive displacement pump 102, the combined exhaust gas recirculation 86 and the intake air 40 flow travels through a third tube 130 to the intake manifold 66.

A control system 140 operatively monitors engine 10 operating parameters and depending on the parameters of the engine 10 varies the position of the control valve 104 and the mixing valve 116.

A conventional fuel system, not shown, is used with the engine 10.

In FIG. 2, an alternative exhaust gas recirculation system 80' is shown. Like elements have been designate by a primed (') number. The alternative exhaust gas recirculation system 80' is operatively attached to the engine 10. The exhaust gas recirculation system 80' includes a pair of supply lines 82' being operatively connected between the flow of exhaust gas 40 and the exhaust gas recirculation cooler 84. The flow of exhaust gas to be recirculated, designated by arrow 86, passes therethrough. The cooling of the exhaust gas recirculation cooler 84 can be of any convention means such as engine 10 jacket water cooling, air to air or an external cooling media. Each of the pair of supply lines 82' has a first end portion 88' attached to the first exhaust manifold portion 50 and the second exhaust manifold portion 52 respectively and at a position spaced at a predetermined distance from the intersection of the first exhaust manifold 50 and the second exhaust manifold portion 52 of the exhaust manifold 44. A second end 90' of each of the supply lines 82' is attached to the inlet end portion 92 of the exhaust gas recirculation cooler 84. The outlet end portion 94 of the exhaust gas recirculation cooler 84 has the first end 96 of the first tube 98 attached thereto. The second end 99 of the first tube 98 is attached to the inlet portion 100 of the positive displacement pump 102. Within the positive displacement pump 102, the exhaust gas recirculation 86 from each of the first exhaust manifold 50 and the second exhaust manifold 52 is pressurized to the second preestablished pressure being at least as high as the first preestablished pressure of the intake air 42. Interposed the first end portion 88' and the second end 90' of each of the supply line 82' is a control valve 104'. The control valve 104' is also operable through a plurality of positions between an open position 106' and a closed position 108', shown in phantom, varying the area through which the exhaust gas recirculation 86 will flow. With the exhaust gas recirculation system 80' as shown in FIG. 2, it is desirable to use a single actuator to control the position of the control valve 104'. The single actuator will control the position of the control valve 104' in each of the pair of supply lines 82' from the respective first exhaust manifold 50 and the second exhaust manifold 52.

INDUSTRIAL APPLICABILITY

In use, the engine 10 is started. Fuel is supplied to each of the plurality of cylinders 34. Intake air 42 is supplied to the engine 10. For example, intake air 42 enters the compressor section 56 and is compressed increasing in pressure and temperature. From the compressor section 56, intake air 42 passes through the aftercooler 60, is cooled becoming more dense and enters into the intake manifold 66 and the respective one of the plurality of cylinders 34. Within the plurality of cylinders 34 the intake air 42 and the fuel are combusted. After combustion, the flow of exhaust gas 40 enters one of the first exhaust manifold portion 50 or the second exhaust manifold portion 52 of the exhaust manifold 44. The flow of exhaust gas 40 enters the turbine section 48 of the turbocharger 46 and drives the compressor section 56. After flowing through the turbocharger 46 the exhaust gas 40 exits through the muffler, not shown, to the atmosphere.

With the engine 10 operating, the positive displacement pump 102 is operating at a fixed speed ratio compared to the speed of the engine 10 crankshaft 20. For example, in this application, the speed ratio of the positive displacement pump 102 is greater than that of the engine 10 crankshaft 20. With the mixing valve 116 in the open position 120, intake air 42 from the compressor section 56 is drawn through the positive displacement pump 102. The mixing valve 116 flow from the aftercooler 60 is used to provide a continuous flow loop when less exhaust gas recirculation flow 86 is required to reduce emissions of the engine 10. The mixing flow loop eliminates the need for an internal pump by pass loop while providing additional cooling of the positive displacement pump 102. The intake air 42 is throttled across the mixing valve 116 to the exhaust gas pressure and is then recompressed by the positive displacement pump 102 to the second preestablished pressure. From the positive displacement pump 102 the intake air 42 is directed to the intake manifold 66 to be distributed to the plurality of cylinders 34.

With the mixing valve 116 in the closed position 122 intake air 42 is prevented from entering the positive displacement pump 102. Thus, exhaust gas 40 for recirculation through the engine 10, exhaust gas recirculation 86, is drawn through the positive displacement pump 102. The exhaust gas recirculation 86 is accelerated and compressed by the positive displacement pump 102. This results in the pressure of the exhaust gas recirculation 86 being at least as high as that of the turbocharged intake air 40 within the intake manifold 66. The result being, exhaust gas recirculation 86 is circulated into and mixed with the intake air 42 within the intake manifold 66. The mixed intake air 42 and the recirculated exhaust gas 86 are distributed to the plurality of cylinders 34 reducing emissions.

With the mixing valve 116 positioned between the open position 120 and the closed position 122 a combination of intake air 42 and exhaust gas recirculation 86 enters the positive displacement pump 102. For example, with the mixing valve 116 nearer the open position 120 a greater amount of intake air 42 verses exhaust gas recirculation 86 is drawn into the positive displacement pump 102. Conversely, with the mixing valve 116 neared the closed position 122 a greater amount of exhaust gas recirculation 86 verses intake air 42 is drawn into the positive displacement pump 102. Thus, exhaust gas recirculation 86 and intake air 42 are drawn through the positive displacement pump 102. The exhaust gas recirculation 86 and the intake air 42 are partially mixed before entering the positive displacement pump 102 and are further mixed within the positive displacement pump 102. The combination of exhaust gas recirculation 86 and intake air 42 are accelerated and compressed by the positive displacement pump 102. This results in the pressure of the combined exhaust gas recirculation 86 and intake air 42 being at least as high as that of the turbocharged intake air 40 within the intake manifold 66. The result being, combined exhaust gas recirculation 86 and intake air 42 are circulated into and further mixed with the intake air 42 within the intake manifold 66. The intake air 42 and combined exhaust gas recirculation 86 and the intake air 42 are distributed to the plurality of cylinders 34 reducing emissions.

During operating conditions of the engine 10 where exhaust gas recirculation 86 is not required, the control valve 104,104' is utilized. For example, if no exhaust gas recirculation 86 is needed the control valve 104,104' is moved into the closed position 108,108' and exhaust gas 40 is prevented from entering the exhaust gas recirculation cooler 84. With the control valve 104,104' in the closed position 108,108' the cooling of the exhaust gas recirculation cooler 84 can also be turned off and energy can be conserved.

The control system 140 operatively monitors engine 10 operating parameters and depending on the parameters of the engine 10 varies the position of the control valve 104,104' and the mixing valve 116.

The exhaust gas recirculation system 80 overcomes the problem of flowing exhaust gas 40 into the engine 10 intake manifold 66 at times when the intake manifold 66 intake air 42 pressure is greater than the exhaust gas 40 pressure by use of the positive displacement pump 102. With the mixing valve 116, the comparative quantity of exhaust gas recirculation 86 and intake air 42 can be regulated. And, with the mixing valve 116 a continuous flow loop is provided, when less exhaust gas flow 86 is required to reduce emissions of the engine 10. The make-up flow loop eliminates the need for an internal pump by pass loop while providing additional cooling of the positive displacement pump 102. The control valve 104 can be used to completely shut off the exhaust gas recirculation 86 flow, for example during transient engine 10 operation.

Other aspects, objects and advantages of this invention can be obtained from a sturdy of the drawings, the disclosure and the appended claims.

What is claimed is:

1. An exhaust gas recirculation system for use with an engine, said engine defining a plurality of operating parameters, having a rotatable member through which an engine speed can be defined and a plurality of cylinders being defined as a part of the engine and an intake manifold being in communication with said plurality of cylinders, said exhaust gas recirculation system comprising:
    a flow of intake air entering said intake manifold and being distributed to a respective one of said plurality of cylinders, said intake air being pressurized to a preestablished pressure by a turbocharger;
    a supply of combustible fuel entering said respective one of said plurality of cylinders;
    a combustion process within said respective one of said plurality of cylinders defining a flow of exhaust gas having a preestablished pressure being less that said preestablished pressure of said intake air during at least a portion of said engine operating parameters;
    a portion of said exhaust gas being circulated to said intake air defining a flow of exhaust gas recirculation, said flow of exhaust gas recirculation being cooled prior to being pressurized to a preestablished level and said pressurization of said flow of recirculated exhaust gas being by a positive displacement pump and being at a pressure at least as great as said preestablished pressure of said intake air; and
    a mixing valve being interposed said flow of intake air exiting said turbocharger and said flow of exhaust gas recirculation; said mixing valve being movable between a closed position and an open position, and in said open position intake air being supplied to said positive displacement pump, said mixture of intake air and said exhaust gas entering said intake manifold and being distributed to at least one of said plurality of cylinders.

2. The exhaust gas recirculation system of claim 1 wherein a portion of said intake air flowing through said positive displacement pump.

3. The exhaust gas recirculation system of claim 2 wherein said positive displacement pump being driven at a speed being greater than said speed of said engine.

4. The exhaust gas recirculation system of claim 3 wherein said positive displacement pump being connected to said engine.

5. The exhaust gas recirculation system of claim 2 wherein said portion of said exhaust gas being recirculated being regulated by said mixing valve.

6. The exhaust gas recirculation system of claim 1 wherein said mixing valve being operable between said open position and said closed position through an infinite number of positions, as said infinite number of positions being operatively controlled by said operating parameters of said engine.

7. The exhaust gas recirculation system of claim 5 wherein said mixing valve being in said open position defining a minimum flow of exhaust gas recirculation.

8. The exhaust gas recirculation system of claim 5 wherein said mixing valve being in said closed position defining a maximum flow of exhaust gas recirculation.

9. The exhaust gas recirculation system of claim 1 wherein said flow of exhaust gas recirculation being cooled being regulated by a control valve.

10. An exhaust gas recirculation system for use with an engine having a plurality of operating parameters, an intake manifold being in communication with a cylinder and a rotatable member, said engine having a turbocharger defining a compressor section compressing a flow of intake air to a first preestablished pressure which is distributed to said intake manifold and being driven by a flow of exhaust gas having a first preestablished pressure, said exhaust gas recirculation system comprising:
    a portion of said flow of exhaust gas being circulated to said intake manifold for distribution to said cylinder and forming a flow of exhaust gas recirculation and said flow of exhaust gas recirculation being cooled prior to entering said intake manifold;
    a portion of said flow of intake air flowing through a positive displacement pump during a portion of said operating parameters of said engine;
    said flow of exhaust gas for circulation to said intake manifold being compressed to a second preestablished pressure by said positive displacement pump, said second preestablished pressure of said flow of exhaust gas recirculation being at least as great as said first preestablished pressure of said intake air; and
    a quantity of said flow of exhaust gas recirculation being controlled by a mixing valve, said mixing valve having an open position in which said portion of said flow of intake air after exiting said turbocharger flows therethrough and a closed position in which said flow of intake air is blocked.

11. The exhaust gas recirculation system of claim 10 wherein said flow of exhaust gas recirculation is at a maximum with said mixing valve in said closed position.

12. The exhaust gas recirculation system of claim 10 wherein said flow of exhaust gas recirculation is at a minimum with said mixing valve in said open position.

13. The exhaust gas recirculation system of claim 10 wherein said mixing valve is infinitely movable between said open position and said closed position.

14. The exhaust gas recirculation system of claim 10 wherein said flow of exhaust gas recirculation being compressed to a second preestablished pressure and said portion of said flow of intake air being mixed with said flow of exhaust gas recirculation prior to said exhaust gas recirculation being compressed.

15. A method of reducing exhaust emissions from an engine having a flow of intake air passing through a turbocharger and being communicated to an intake manifold of said engine for distribution to a plurality of cylinders of said engine, said flow of intake air being at a preestablished pressure, a flow of exhaust gas being at a preestablished pressure being less than said preestablished pressure of said intake air; said method of reducing exhaust emission comprising the steps of:

extracting a portion of said flow of exhaust gas forming a flow of exhaust gas recirculation;

cooling said flow of exhaust gas recirculation;

increasing said pressure of said flow of exhaust gas recirculation with a positive displacement pump to a quantity being at least equivalent to said pressure of said flow of intake air;

blending said flow of exhaust gas recirculation and a portion of said flow of intake air after passing through said turbocharger prior to said pressure of said flow of exhaust gas recirculation being increased to a quantity being at least equivalent to said pressure of said flow of intake air; and communicating said blended exhaust and said intake air to said intake manifold for distribution to at least one of said plurality of cylinders.

16. The method of reducing exhaust emissions of claim 15 wherein said step of cooling said flow of exhaust gas recirculation being cooled by an exhaust gas recirculation cooler.

17. The method of reducing exhaust emission of claim 15 wherein said positive displacement pump being driven by said engine at a speed being greater than a speed of said engine.

18. The method of reducing exhaust emission of claim 15 wherein said step of blending said flow of exhaust gas recirculation and a portion of said flow of intake air after passing through said turbocharger prior to said pressure of said flow of exhaust gas recirculation being increased including a mixing valve having an open position and a closed position.

19. The method of reducing exhaust emission of claim 18 wherein said flow of exhaust gas recirculation being at a maximum with said mixing valve being in said closed position.

20. The method of reducing exhaust emission of claim 18 wherein said flow of exhaust gas recirculation being at a minimum with said mixing valve in said open position.

* * * * *